(12) United States Patent
Homma

(10) Patent No.: US 11,372,475 B2
(45) Date of Patent: Jun. 28, 2022

(54) INFORMATION PROCESSING APPARATUS, INFORMATION PROCESSING METHOD, AND FLOOR MODELING SYSTEM

(71) Applicant: SONY CORPORATION, Tokyo (JP)

(72) Inventor: Shunichi Homma, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/049,785

(22) PCT Filed: Feb. 25, 2019

(86) PCT No.: PCT/JP2019/007011
§ 371 (c)(1),
(2) Date: Oct. 22, 2020

(87) PCT Pub. No.: WO2019/215997
PCT Pub. Date: Nov. 14, 2019

(65) Prior Publication Data
US 2021/0255695 A1 Aug. 19, 2021

(30) Foreign Application Priority Data
May 10, 2018 (JP) .............................. JP2018-091548

(51) Int. Cl.
*G06F 3/01* (2006.01)
*G06T 7/73* (2017.01)
*G06T 17/00* (2006.01)

(52) U.S. Cl.
CPC ............... *G06F 3/011* (2013.01); *G06T 7/75* (2017.01); *G06T 17/00* (2013.01); *G06T 2200/08* (2013.01); *G06T 2207/30204* (2013.01)

(58) Field of Classification Search
CPC .. G06T 7/70; G06T 7/75; G06T 17/00; G06T 2200/08; G06T 2207/30204; G06F 3/11
See application file for complete search history.

(56) References Cited

U.S. PATENT DOCUMENTS

2014/0335893 A1* 11/2014 Ronen ................... G01S 5/0252
455/456.1
2014/0350839 A1 11/2014 Pack et al.
(Continued)

FOREIGN PATENT DOCUMENTS

| CA | 3023488 A1 | 10/2017 |
| CN | 105074600 A | 11/2015 |

(Continued)

OTHER PUBLICATIONS

Ciccio et al., "A Model Proposal for Augmented Reality Game Creation to Incentivize Physical Activity", Escuela de Ciencias de la Computación e Informática, Universidad de Costa Rica, Montes de Oca (Year: 2017).*

(Continued)

*Primary Examiner* — Diane M Wills
(74) *Attorney, Agent, or Firm* — Chip Law Group

(57) ABSTRACT

An information processing apparatus according to the present technology includes a control section. The control section includes a determination section and a model data generation section. The determination section determines whether or not a predetermined modeling condition is satisfied on the basis of sensor data acquired along with a movement of a moving object. In a case where it is determined by the determination section that the predetermined modeling condition is satisfied, the model data generation section generates model data relating to the floor using the sensor data.

9 Claims, 18 Drawing Sheets

(56) References Cited

U.S. PATENT DOCUMENTS

| | | |
|---|---|---|
| 2015/0362921 A1 | 12/2015 | Hanaoka et al. |
| 2016/0343173 A1 | 11/2016 | Mullins |
| 2018/0108147 A1* | 4/2018 | Kim .................. G06F 3/0482 |
| 2018/0255528 A1 | 9/2018 | Ronen |
| 2019/0051051 A1 | 2/2019 | Kaufman et al. |
| 2019/0114797 A1* | 4/2019 | Bleyer .................. G06F 16/56 |
| 2019/0128677 A1* | 5/2019 | Naman ................ G05D 1/0246 |
| 2019/0223138 A1 | 7/2019 | Ronen |
| 2019/0349562 A1* | 11/2019 | Oh ........................ G06T 17/00 |
| 2020/0107289 A1 | 4/2020 | Ronen |

FOREIGN PATENT DOCUMENTS

| | | | |
|---|---|---|---|
| EP | 2773974 A1 | | 9/2014 |
| JP | 2005-092820 A | | 4/2005 |
| JP | 2005-157689 A | | 6/2005 |
| JP | 2008-264946 A | | 11/2008 |
| JP | 2009-136987 A | | 6/2009 |
| JP | 2009136987 A | * | 6/2009 |
| KR | 10-2014-0099875 A | | 8/2014 |
| KR | 10-2020-0041333 A | | 4/2020 |
| WO | 2013/065042 A1 | | 5/2013 |
| WO | 2014/132509 A1 | | 9/2014 |
| WO | 2016/187474 A1 | | 11/2016 |
| WO | 2017/180990 A1 | | 10/2017 |

OTHER PUBLICATIONS

Extended European Search Report of EP Application No. 19800136.4, dated Apr. 19, 2021, 08 pages.
International Search Report and Written Opinion of PCT Application No. PCT/JP2019/007011, dated Mar. 26, 2019, 08 pages of ISRWO.

* cited by examiner

Center position mPfc of model
data generated at arbitrary time T

Modeled region

Modeled region

Modeled region

INFORMATION PROCESSING APPARATUS, INFORMATION PROCESSING METHOD, AND FLOOR MODELING SYSTEM

CROSS REFERENCE TO RELATED APPLICATIONS

This application is a U.S. National Phase of International Patent Application No. PCT/JP2019/007011 filed on Feb. 25, 2019, which claims priority benefit of Japanese Patent Application No. JP 2018-091548 filed in the Japan Patent Office on May 10, 2018. Each of the above-referenced applications is hereby incorporated herein by reference in its entirety.

TECHNICAL FIELD

The present technology relates to an information processing apparatus that generate a real world floor as model data that can be processed by a computer, an information processing method, a program, and a floor modeling system.

BACKGROUND ART

In the related art, a variety of HMDs (Head Mounted Displays) have been proposed as an apparatus for providing a user with an AR/VR application having a sense of immersion. Such an HMD has a function of displaying virtual information corresponding to a real world in a superimposed manner or changing display information in accordance with a movement of a user's head wearing the HMD. In general, the HMD is often equipped with a self-position estimation apparatus for grasping the movement of the user's head and a sensor group for improving estimation accuracy of the self-position estimation apparatus.

In order to display the virtual information conforming to the real world on the HMD, it is necessary to acquire three-dimensional information of the real world. For example, Patent Literature 1 describes a technology in which three-dimensional information in the real world of an object is acquired by capturing an object to be modeled (e.g., floor) by a camera, and the object is expressed as model data that can be processed by a computer using the information.

CITATION LIST

Patent Literature

Patent Literature 1: Japanese Patent Application Laid-open No. 2005-92820

DISCLOSURE OF INVENTION

Technical Problem

In order to provide a user with an AR/VR application having a sense of immersion, it is necessary to accurately model a floor. For this purpose, it is necessary to accurately acquire three-dimensional information about the floor which is a target of modeling. However, in order to accurately acquire the three-dimensional information of the floor by using the technology described in Patent Literature 1, for example, it is necessary to keep the user wearing the HMD equipped with the camera in a specific posture, which may increase a burden on the user.

In view of the above circumstances, an object of the present technology is to provide an information processing apparatus that can accurately model a floor while reducing the burden on the user, an information processing method, a program, and a floor modeling system.

Solution to Problem

In order to achieve the above object, an information processing apparatus according to an embodiment of the present technology includes a control section.

The control section includes a determination section and a model data generation section.

The determination section determines whether or not a predetermined modeling condition is satisfied on the basis of sensor data acquired along with a movement of a moving object.

In a case where it is determined by the determination section that the predetermined modeling condition is satisfied, the model data generation section generates model data relating to a floor using the sensor data.

The information processing apparatus of the present technology automatically generates the model data relating to the floor if a predetermined modeling condition is satisfied. This makes it possible to generate the model data relating to the floor without directly observing the floor that is the target of modeling. Therefore, in order to observe the floor, for example, it is unnecessary to keep the user in a specific posture such as always facing a floor side, so that the burden on the user can be reduced.

Further, the information processing apparatus of the present technology generates the model data relating to the floor along with the movement of the moving object only when the predetermined modeling condition is satisfied. This eliminates erroneous recognition that a region other than the floor is recognized as the floor by a moving body moving only on a physically correct floor, and enables accurate modeling of the floor.

Therefore, according to the present technology, it is possible to provide the information processing apparatus capable of accurately modeling the floor while reducing the burden on the user.

The control section may further include a data acquisition section that acquires the sensor data every predetermined time along with the movement of the movable body movable on the floor.

The control section may further include a calculation section that calculates a movement amount of the moving body and a displacement amount of a posture of the moving body on the basis of the sensor data acquired from the data acquisition section, the determination section may determine whether or not the movement amount satisfies a predetermined first condition and whether or not the displacement amount satisfies a predetermined second condition from a calculation result of the calculation section, and the model data generation section may generate the model data using sensor data based on a determination result determined by the determination section to satisfy the first and second conditions.

This avoids modeling of the floor when the moving object is not in the predetermined posture. That is, it is possible to model the floor only when the moving body is in a state close to the predetermined posture and to model only the physically correct floor.

The calculation section may calculate a difference between a height of the moving body in a first posture from the floor in a gravity direction and a height of the moving body in a second posture from the floor in the gravity direction as the movement amount, the determination section may determine that the first condition is satisfied if the difference is equal to or less than a predetermined threshold value.

The calculation section may calculate a gravity acceleration vector of the moving body from the sensor data acquired from the data acquisition section and may calculate the displacement amount on the basis of the gravity acceleration vector.

The calculation section may calculate an angle formed by the gravity acceleration vector of the moving body in the first posture and the gravity acceleration vector of the moving body in the second posture as the displacement amount, and the determination section may determine that the second condition is satisfied if the angle is equal to or less than a predetermined threshold value.

The calculation section may calculate a coordinate position where the gravity acceleration vector of the moving body is orthogonal to a virtual plane in parallel with the floor as an initial position of the moving body, and the model data generation section may generate the model data at a position apart from the virtual plane by a predetermined distance in the gravity direction.

Thus, the model data relating to the floor is generated at the position apart from the virtual plane by the predetermined distance in the gravity direction. Therefore, since the model data is always generated at a certain distance from the virtual plane, the modeling more suitable to the floor becomes possible under an environment in which the floor is configured only of a smooth plane that does not include stairs, a slope, or the like.

The calculation section may calculate a distance between the floor on which a marker is placed and the moving body from the coordinate position of the moving body in a marker coordinate system with reference to the marker placed on the floor, and the model data generation section may generate the model data at the position apart from the virtual plane by the predetermined distance in the gravity direction.

As a result, the modeling of the floor becomes possible without using a height of a user, and variations in modeling accuracy caused by different heights of the user are suppressed.

The control section may further include a walking state determination section that determines whether or not the user having the moving body is in a walking state on the basis of the sensor data acquired from the data acquisition section.

This allows continuous modeling of the floor even under the environment where the slope or the like exists.

The control section may further include an update section that executes update processing in which sensor data different from sensor data detected by the moving body at the time of the reference posture is sensor data of a new reference posture in a case where a period during which the user is determined to be in the walking state by the walking state determination section is equal to or longer than a predetermined threshold value.

This allows the modeling of a floor having a height other than the height corresponding to the reference posture as well under an environment in which there is a difference in height such as a slope, a staircase, or the like.

In order to achieve the above object, an information processing method according to an embodiment of the present technology includes determining whether or not a predetermined modeling condition is satisfied on the basis of sensor data acquired along with a movement of a moving body.

In a case where it is determined that the predetermined modeling condition is satisfied, the model data relating to the floor is generated using the above sensor data.

In order to achieve the above object, a program according to an embodiment of the present technology causes an information processing apparatus to execute the following steps:

a step of determining whether or not to satisfy a predetermined modeling condition on the basis of sensor data acquired along with a movement of a moving object, and a step of generating model data relating to a floor using the sensor data in a case where it is determined that the predetermined modeling condition is satisfied.

In order to achieve the above object, a floor modeling system according to an embodiment of the present technology includes a self-position estimation apparatus, an acceleration sensor, and an information processing apparatus.

The self-position estimation apparatus is mounted on a moving body moving on a floor, and is configured to be able to estimate a position of the moving body in a three-dimensional space.

The acceleration sensor is mounted on the moving body.

The information processing apparatus has a control section.

The control section includes a determination section and a model data generation section.

The determination section determines whether or not a predetermined modeling condition is satisfied on the basis of the sensor data acquired along with the moving object of the moving object.

In a case where it is determined that the predetermined modeling condition is satisfied by the determination section, the model data generation section generates model data relating to the floor using the sensor data.

Advantageous Effects of Invention

As described above, according to the present technology, it is possible to provide an information processing apparatus that can accurately model a floor while reducing the burden on the user, an information processing method, a program, and a floor modeling system. Note that the above effects are not necessarily limited, and any of the effects shown in the specification or other effects that can be grasped from the present specification may be achieved together with the above effects or in place of the above effects.

MODE(S) FOR CARRYING OUT THE INVENTION

Hereinafter, embodiments in which the floor modeling system according to the present technology is applied to a head mounted display (hereinafter referred to as "HMD") which is an example of a moving body moving on a floor will be described with reference to the drawings.

1. First Embodiment

[Configuration of Floor Modeling System]

Figure 1:
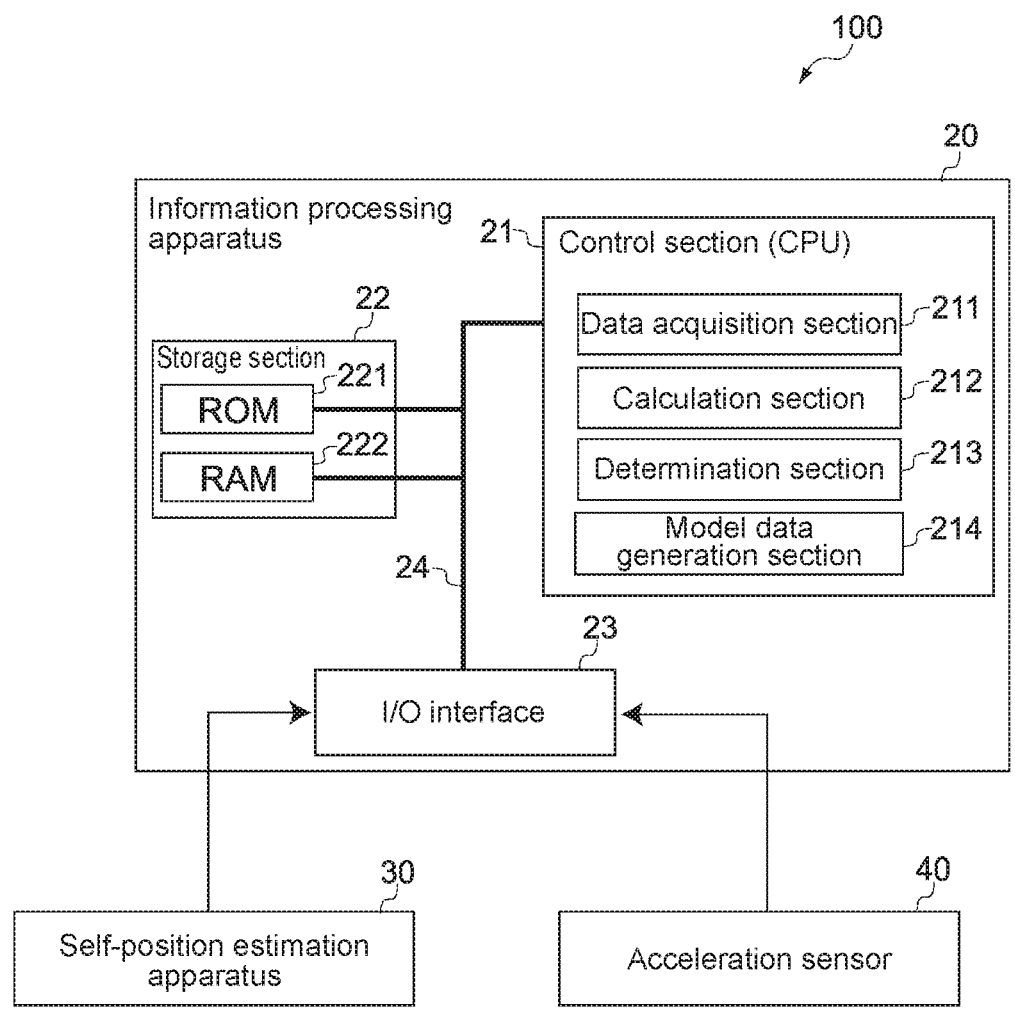
FIG. 1 is a block diagram showing a configuration example of a floor modeling system according to an embodiment of the present technology.

FIG. 1 is a block diagram showing a configuration example of a floor modeling system 100 according to an embodiment of the present technology. As shown in FIG. 1, the floor modeling system 100 includes an information processing apparatus 20, a self-position estimation apparatus 30, and an acceleration sensor 40.

The information processing apparatus 20 includes hardware necessary for a computer such as a control section 21 (CPU), a storage section 22, an I/O interface 23, and a bus 24. The storage section 22 includes a ROM 221 and a RAM 222.

The ROM 221 is a memory device in which various types of data, programs, and the like used in the information processing apparatus 20 are stored in a fixed manner.

The RAM 222 is used as a working area for the control section 21, a temporary storage space for history data, and the like. The RAM 222 may be, for example, an SRAM (Static Random Access Memory), a DRAM (Dynamic Random Access Memory), an SDRAM (Synchronous Dynamic Random Access Memory) or the like.

The storage section 22 may include a non-volatile memory such as an HDD (Hard Disc Drive) and a flash memory (Solid State Drive). The storage section 22 stores the sensor data output from the self-position estimation apparatus 30 and the acceleration sensor 40, and the model data or the like output from the control section 21.

The control section 21 loads and executes a program according to the present technology stored in the ROM 221 to the RAM 222. This controls an overall operation of the floor modeling system 100 and a method of modeling the floor as described below. The program is installed in the information processing apparatus 20, for example, through various storage media (internal memory). Alternatively, installation of the program may be executed via the Internet, for example.

Further, as shown in FIG. 1, the control section 21, functionally includes a data acquisition section 211, an calculation section 212, a determination section 213, and a model data generation section 214.

The data acquisition section 211 acquires the sensor data output from the self-position estimation apparatus 30 and the acceleration sensor 40 every predetermined time.

The calculation section 212 calculates a movement amount of the HMD and a displacement amount of a posture of the HMD on the basis of the sensor data acquired from the data acquisition section 211. The determination section 213 determines whether or not a predetermined modeling condition is satisfied on the basis of the sensor data acquired from the data acquisition section 211.

If the determination section 213 determines that the predetermined modeling condition is satisfied, the model data generation section 214 generates model data relating to the floor using the sensor data acquired from the data acquisition section 211.

The I/O interface 23 is connected to the control section 21 and the storage section 22 via a bus 24. The I/O interface 23 functions as an input/output interface of the information processing apparatus 20. Accordingly, the sensor data output from the self-position estimation apparatus 30 and the acceleration sensor 40 via the I/O interface 23 is output to the control section 21 and the storage section 22.

The bus 24 is a signal transmission path for inputting and outputting various signals between the respective portions of the information processing apparatus 20. The control section 21, the ROM 221, the RAM 222, and the I/O interface 23 are connected to each other through the bus 24.

The self-position estimation apparatus 30 is mounted on the HMD, it is configured to estimate a position of the HMD in a three-dimensional space. The self-position estimation apparatus 30 is, for example, an SLAM (Simultaneous Localization and Mapping) using a camera sensor, or the like.

The acceleration sensor 40 is mounted on the HMD and is configured to measure acceleration in a three-axis direction of the coordinate system representing the position of the HMD in the three-dimensional space. As the acceleration sensor 40, a piezoelectric type acceleration sensor, a servo type acceleration sensor, a strain type acceleration sensor, a semiconductor type acceleration sensor, or the like can be employed and its type does not matter.

[Floor Modeling Method]

Figure 2:
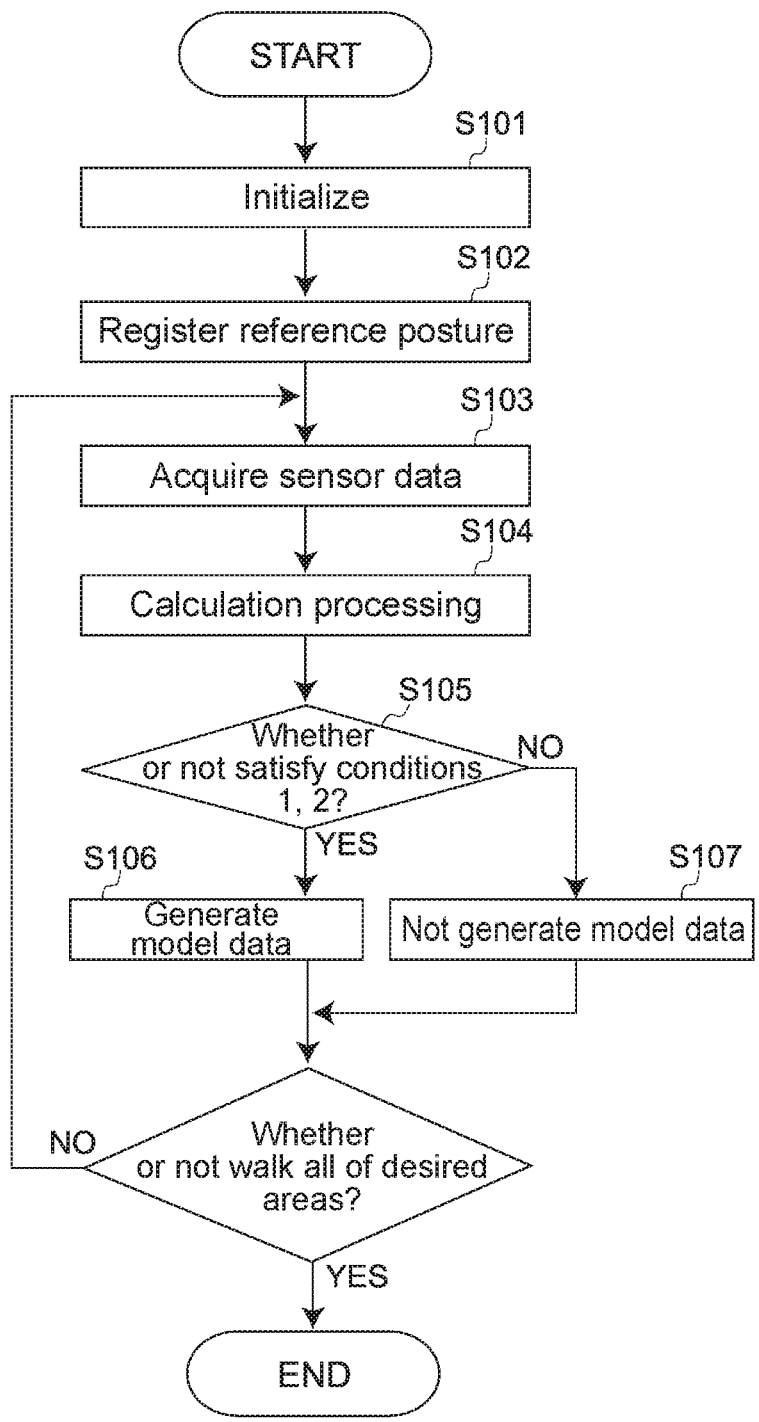
FIG. 2 is a flowchart showing a method of modeling the floor according to the floor modeling system.

FIG. 2 is a flowchart showing a method of modeling the floor according to the floor modeling system 100. Hereinafter, the method of modeling the floor according to the present technology will be described with reference to FIG. 2, as appropriate.

First, the coordinate position of the HMD in the three-dimensional space is initialized in an appropriate coordinate system (Step S101). In Step S101, for example, calibration of a movement parameter along the X, Y and Z axes directions in a world coordinate system and a rotational parameter around the X, Y and Z axes is performed. As a result, the position of the HMD in the three-dimensional space is expressed by the coordinate system.

Next, the reference posture (first posture) of the HMD is registered (Step S102). Specifically, in a state in which a user wearing the HMD stands upright, the sensor data output from the self-position estimation apparatus 30 and the acceleration sensor 40, and information about a height of the user output from an arbitrary input section (not shown) are input to the data acquisition section 211. Then, the data acquisition section 211 outputs the information to the calculation section 212, and calculation processing is executed by the calculation section 212.

Figure 5:
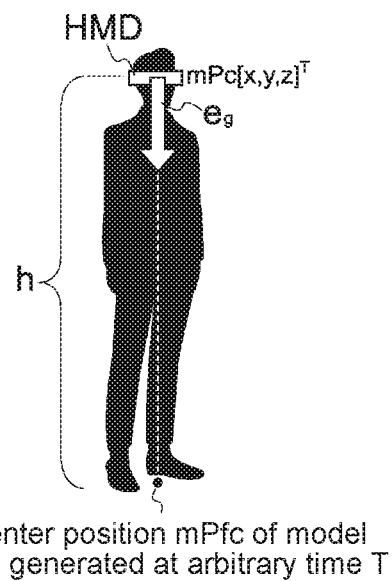
FIG. 5 is a conceptual diagram showing an example in which the floor modeling system according to the present technology generates model data relating to the floor.
Figure 6:
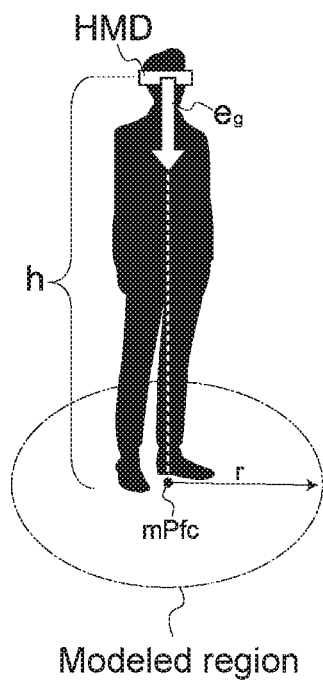
FIG. 6 is a conceptual diagram showing an example in which the floor modeling system according to the present technology generates model data relating to the floor.

Thus, the coordinate position and the gravity acceleration vector Vb of the HMD at the time of the reference posture, and a distance h between the HMD and the floor at the time of the reference posture (see FIG. 5) are calculated, these are stored in the storage section 22.

Note that the reference posture is a posture of the HMD in a state in which the user wearing the HMD stands upright, and has the same meaning in the following description. The coordinate position of the HMD at the time of the reference posture is represented by $(R_b, t_b)$ in a case where the movement parameter along the X, Y, and Z axes in the arbitrary world coordinate system is set to t and the rotation parameter around the X, Y, and Z axes is set to R.

The distance h between the HMD and the floor is calculated on the basis of the height of the user wearing the HMD. Here, since the distance h does not matched with the height of the user, the distance h is calculated in consideration of the distance between a top of the user's head and the HMD. For example, the distance h is obtained by determining an average value from a sample set of distances between the top of the user's head and the HMD stored in the storage section 22, and calculating a difference between the height of the user and the average value.

Subsequently, after a predetermined time has elapsed since Step S102 is executed, the sensor data is output from the self-position estimation apparatus 30 and the acceleration sensor 40. The sensor data is output to the data acquisition section 211 via the I/O interface 45 (Step S103). The data acquisition section 211 outputs the sensor data output from the self-position estimation apparatus 30 and the acceleration sensor 40 to the calculation section 212.

The calculation section 212 that acquires the sensor data from the data acquisition section 211 calculates the coordinate position and the gravity acceleration vector Vg of the HMD (HMD at time of second posture) after the movement from the reference posture on the basis of the sensor data, and these are stored in the storage section 22. The coordinate position of the HMD after the movement from the reference posture is represented as (R, t) in a case where the movement parameter along the X, Y and Z axes in the arbitrary world coordinate system is t and the rotational parameter around the X, Y and Z axes is R, and is expressed by the same coordinate system as the coordinate position $(R_b, t_b)$ in the reference posture.

Next, the calculation section 212 calculates the movement amount of the HMD and the displacement amount of the posture of the HMD (Step S104). Specifically, the calculation section 212 calculates the movement amount of the HMD using the coordinate position $(R_b, t_b)$ of the HMD at the time of the reference posture calculated in the previous Step S102 and the coordinate position (R, t) of the HMD after the movement from the reference posture. The movement amount is a difference Δh between a distance between the HMD and the floor after the movement from the reference posture and a distance between the HMD and the floor at the reference posture (see FIG. 3).

Further, the calculation section 212 calculates the displacement amount of the posture of the HMD by using the gravity acceleration vector Vb of the HMD at the time of the reference posture which is calculated in the previous Step S102 and the gravity acceleration vector Vg of the HMD after the movement from the reference posture. The displacement amount is an angle θ formed by the gravity acceleration vector Vb and the gravity acceleration vector Vg. Information about the difference Δh calculated by the calculation section 212 and the angle θ is output to the determination section 213.

Next, the determination section 213 determines whether or not the movement amount and the displacement amount calculated in the previous Step S104 satisfy the predetermined modeling condition (Step S105). The modeling condition means whether or not the difference Δh is equal to or less than a predetermined threshold value (condition 1), and whether or not the angle θ is equal to or less than a predetermined threshold value (condition 2).

Figure 3:
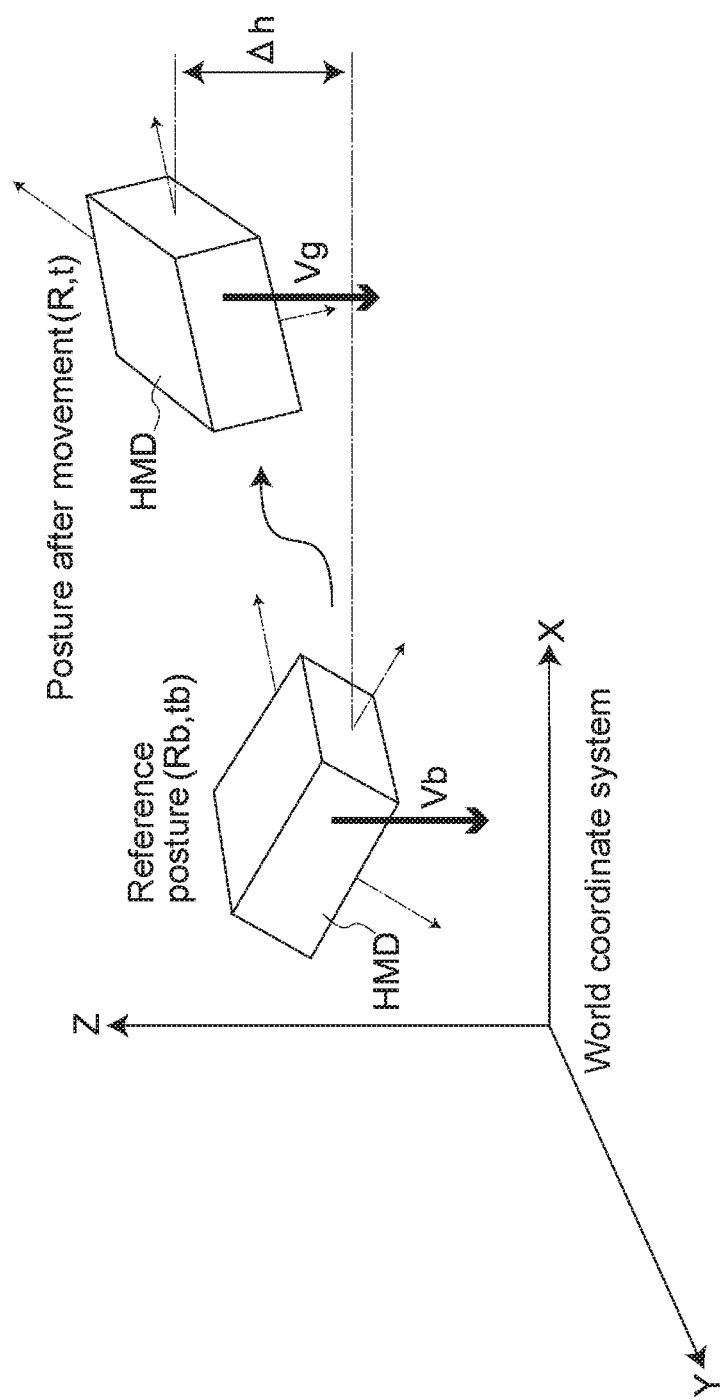
FIG. 3 is a conceptual diagram for explaining a condition 1.

FIG. 3 is a conceptual diagram for explaining the condition 1. In the condition 1, it is confirmed whether or not the height of the HMD from the floor is close to the height of the HMD from the floor at the time of the reference posture. Incidentally, the threshold values of conditions 1 and 2 may be arbitrarily set by the user. In this case, the threshold value of one or both of the conditions 1 and 2 may be calculated using machine learning. Specifically, for example, it may be calculated by applying arbitrary input data from the user to a learned model obtained by causing a machine learning algorithm to learn a threshold value set in the past (see FIG. 17).

Figure 4:
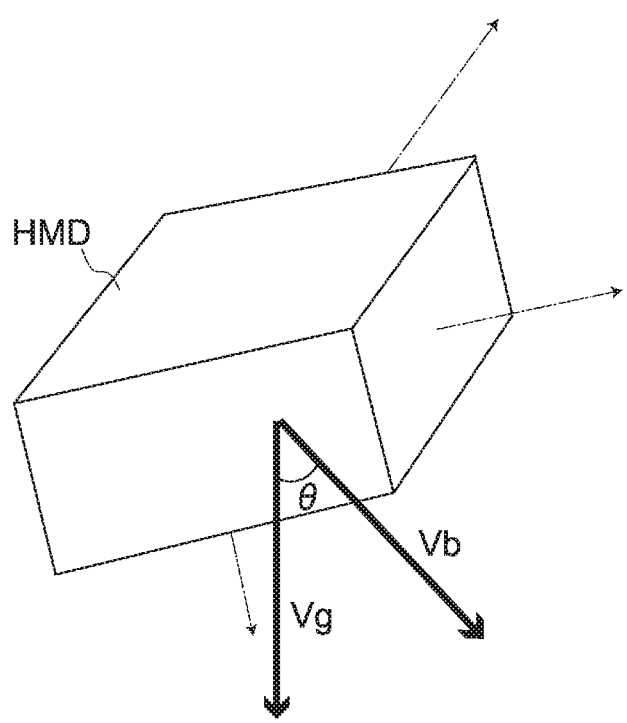
FIG. 4 is a conceptual diagram for explaining a condition 2.

Further, FIG. 4 is a conceptual diagram for explaining the condition 2. In the condition 2, it is confirmed whether or not the rotation parameter of the HMD after the movement from the reference posture is close to the rotation parameter of the HMD at the time of the reference posture. Incidentally, the threshold value of the condition 2 may be arbitrarily set by the user.

Next, if the determination section 213 determines that the movement amount calculated in Step S104 satisfies the condition 1 (difference Δh is equal to or less than predetermined threshold value) and that the displacement amount satisfies the condition 2 (angle θ is equal to or less than predetermined threshold value) (YES in S105), the model data generation section 214 reads the sensor data based on the determination result from the storage section 22 and generates the model data relating to the floor at a position apart by h in the gravity direction from the HMD using the sensor data (Step S106).

On the other hand, if the determination section 213 does not determine that the movement amount calculated in Step S104 satisfies the condition 1 and the displacement amount satisfies the condition 2 (NO in Step S105), the model data generation section 214 does not use the sensor data based on the determination result and does not generate the model data relating to the floor (Step S107).

Figure 16:
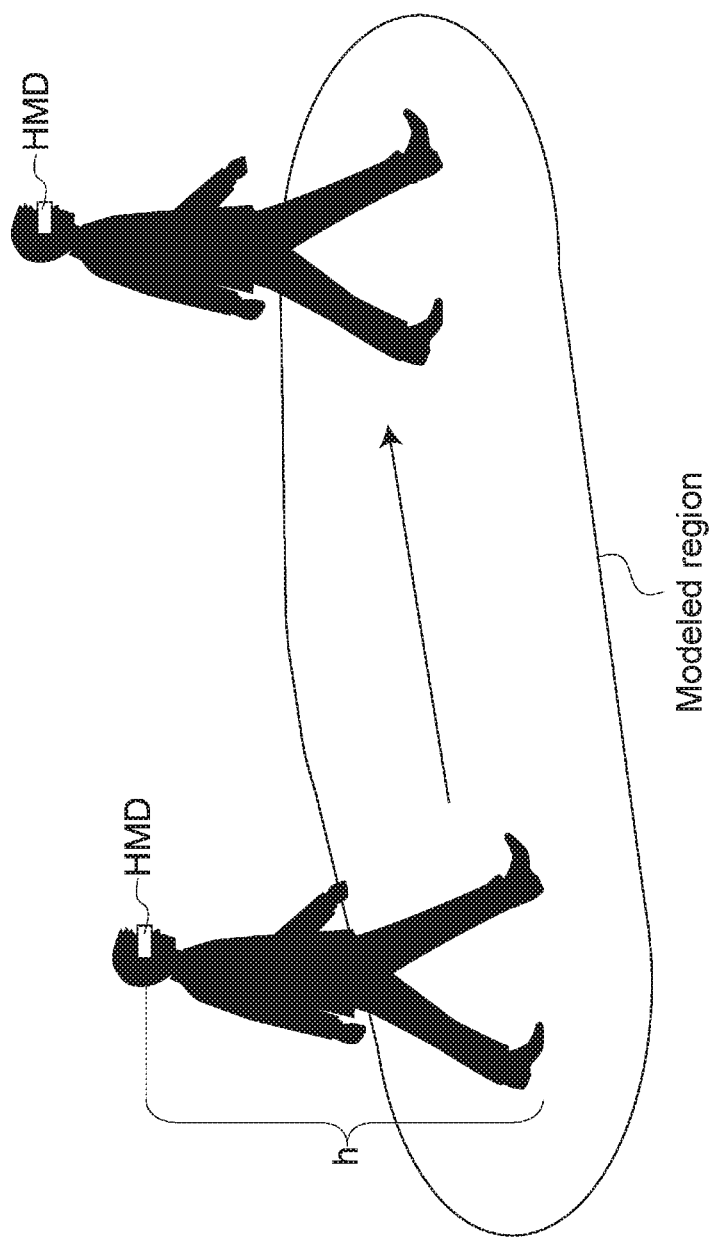
FIG. 16 is a conceptual diagram for explaining the floor modeling method of the embodiment.

Thereafter, until the user walks all of desired areas, a series of operations from Step S103 to Step S107 (Step S103 to Step S104 to Step S105 to Step S106 (Step S107)) is repeated every predetermined time, and the modeling of the floor is performed as the user wearing the HMD walks (see FIG. 16).

Here, the modeling in the present technology means that the model data corresponding to the floor is generated by calculating and processing information in which the floor physically and actually existing is converted into numerical data. FIGS. 5 to 8 are conceptual diagrams showing an example in which the floor modeling system according to the present technology generates the model data relating to the floor.

The model data in the present technology is defined by a region of radius r centered at any coordinate position (see FIG. 6), and the floor within this region becomes the modeled floor. At this time, assuming that a coordinate position on the three-dimensional space of the HMD at an arbitrary time T is $P_c[X,Y,Z]^T$, a gravity direction unit vector is $e_g$, and the distance from the HMD to the floor is h, a center position of the model data is expressed by the following equation (1). Note that r is an arbitrary parameter, and may be arbitrarily set by the user, or may be set by recognizing a surrounding environment.

[Math. 1]

$$_mP_{fc} = {_mP_c} + h \cdot {}^*e_g \quad (1)$$

(m: model data coordinates, c: camera, fc: center of floor model)

Examples of the method of expressing the model data include a method of expressing the model data by a point cloud, a method of expressing the model data by polygon data, and the like.

Figure 7:
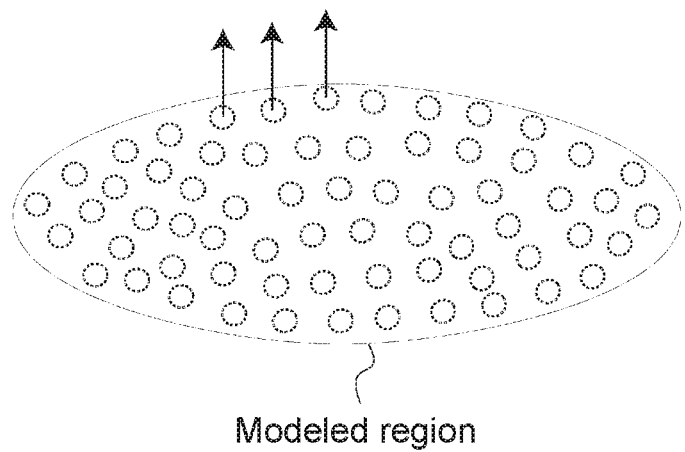
FIG. 7 is a conceptual diagram showing an example in which the floor modeling system according to the present technology generates model data relating to the floor.

In a case where the model data is expressed by the point cloud, the model data (region where floor is modeled) includes a group of three-dimensional points configuring a virtual region defined by the radius r from the center position $_mP_{fc}$ (see FIG. 7). Arrows in FIG. 7 indicate normal vectors associated with respective points.

Figure 8:
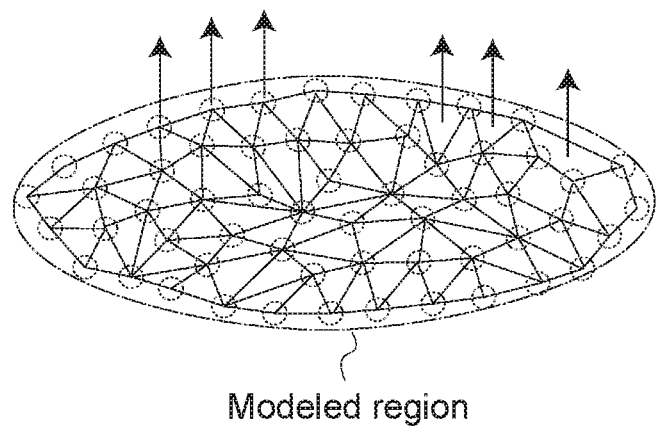
FIG. 8 is a conceptual diagram showing an example in which the floor modeling system according to the present technology generates model data relating to the floor.

Further, in a case where the model data is expressed by the polygon data, the model data (region where floor is modeled) includes a group of planes configuring the virtual region defined by the radius r from the center position $_mP_{fc}$ (see FIG. 8). The planes include a group of points (vertex data) filled in the virtual region at an arbitrary density. Arrows in FIG. 8 are normal vectors associated with respective points and planes.

[Action]

The floor modeling system 100 according to the present embodiment automatically generates the model data relating to the floor if the above-mentioned conditions 1 and 2 are satisfied. That is, only when the HMD is close to the reference posture, it regards that the user stands upright, and the model data is generated with respect to the feet of the user.

This makes it possible to generate the model data relating to the floor without directly observing the floor to be modeled. Therefore, in order to generate the model data relating to the floor, it is not necessary to keep the user wearing the HMD in a specific posture such as always facing the floor side, thereby reducing the burden on the user.

In addition, since it is not necessary to directly observe the floor, a sensor such as a high viewing angle sensen for observing the floor is not required, such that it becomes possible to reduce a device cost and thus a power consumption for configuring the floor modeling system 100.

Furthermore, in the floor modeling system 100 of the present embodiment, if the movement amount of the movable body satisfies the first condition and if the displacement amount of the posture of the movable body satisfies the second condition, the modeling of the floor is performed without using a sensor for floor observation. This also enables the modeling of the floor, which is difficult to observe with general sensors. Examples of such a floor include a texture-less floor which is unsuitable for estimation of a three-dimensional structure by a stereoscopic method, a black floor which is unsuitable for observation by an active depth sensor, and a floor which is made of a material having high reflectance or high transmittance of light.

In addition, in the floor modeling system 100, the model data relating to the floor is generated as the moving object moves only when the conditions 1 and 2 are satisfied. In other words, when the user wearing the HMD moves while the conditions 1 and 2 are satisfied, the model data relating to the floor is cumulatively generated (see FIG. 16).

Thus, when the user wearing the HMD walks only on the floor to be modeled, and thus only the model data relating to the floor is generated. In this case, since the user wearing the HMD moves only on the physically correct floor, there is no erroneous recognition that the region other than the floor is recognized as the floor, and the floor can be accurately modeled.

For example, in a case where a chair is placed on the floor and the user wearing the HMD does not walk on the floor, the modeling of the floor on which the chair is placed is avoided. Even if the user sits in the chair, the condition 1 is not satisfied, so that the modeling of the floor on which the chair is placed is avoided anyway.

2. Second Embodiment

[Floor Modeling Method]

Figure 9:
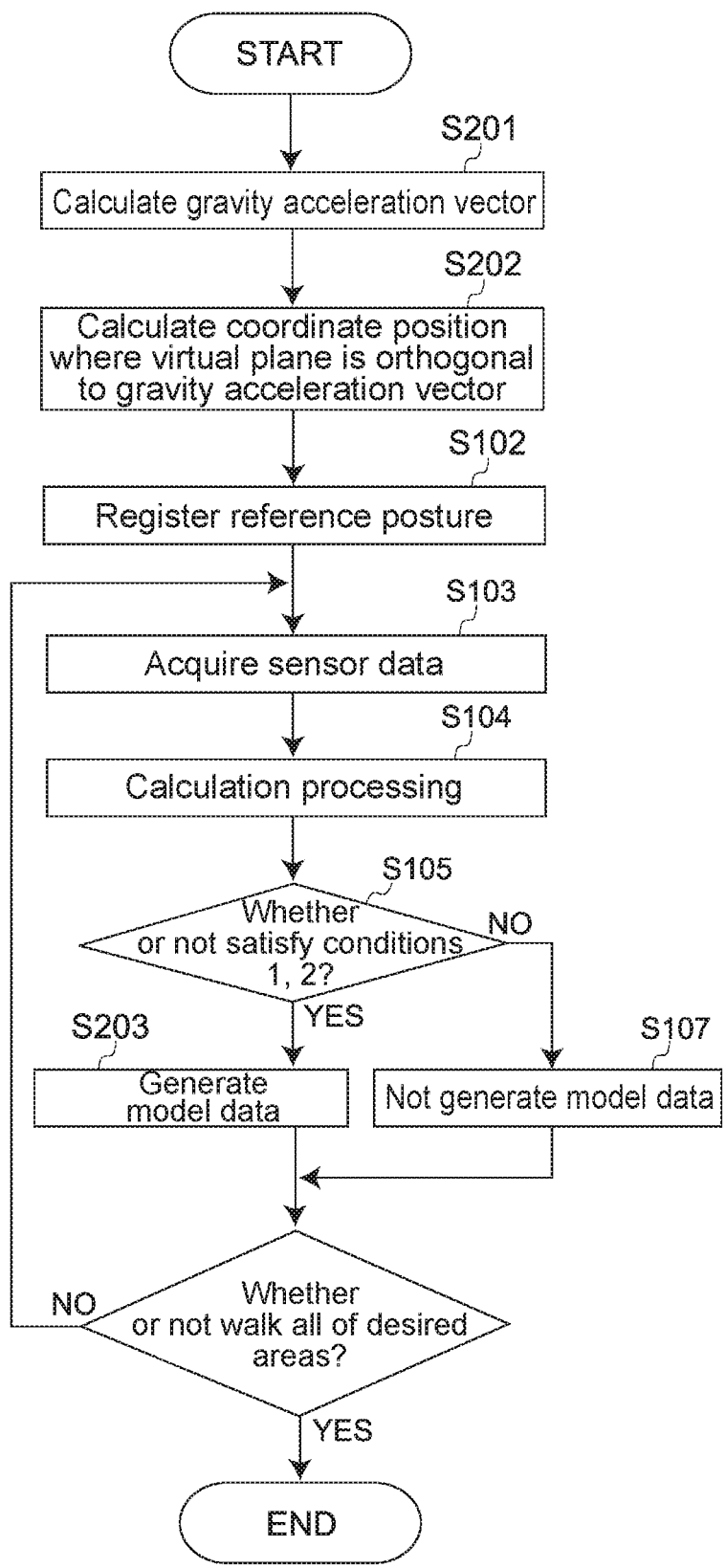
FIG. 9 is a flowchart showing a method of modeling the floor by a floor modeling system according to a second embodiment of the present technology.
Figure 10:
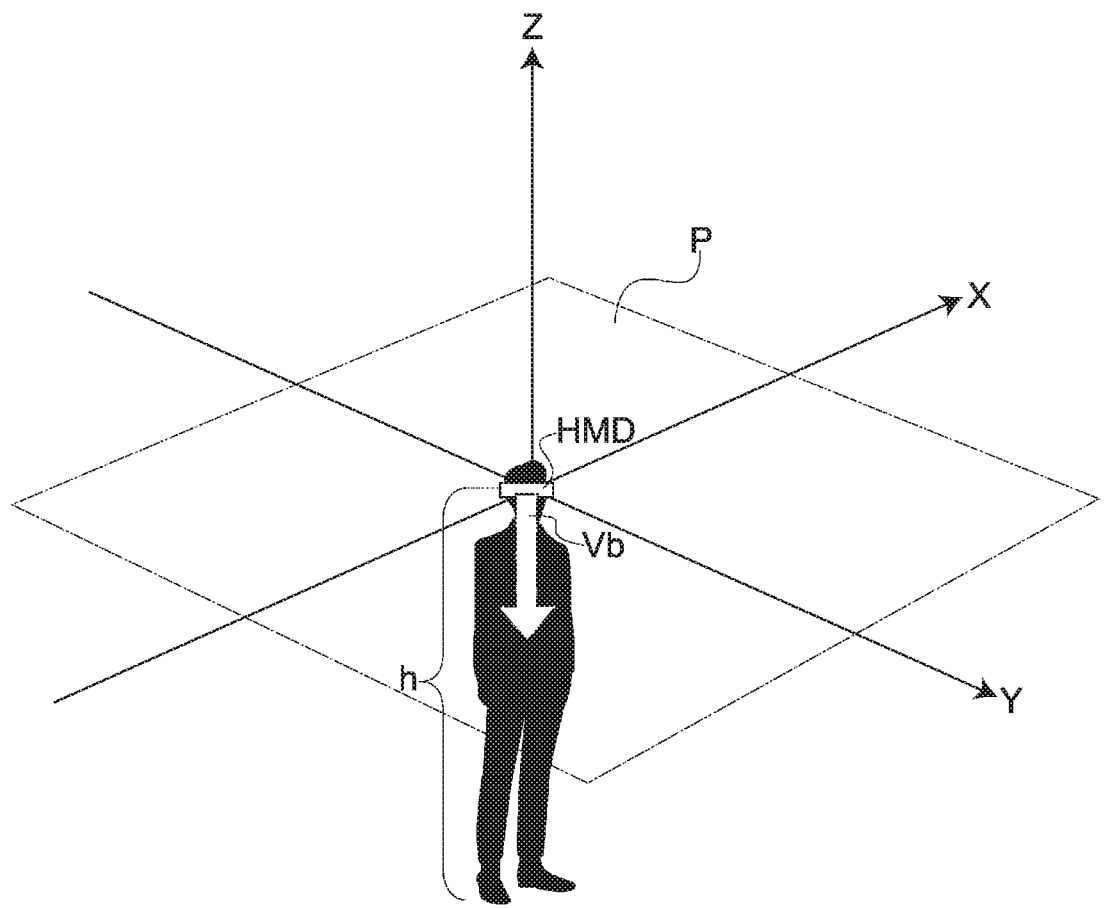
FIG. 10 is a conceptual diagram for explaining the floor modeling method of the embodiment.

FIG. 9 is a flowchart showing a method of modeling the floor by the floor modeling system 100 according to a second embodiment of the present technology, and FIG. 10 is a conceptual diagram for explaining the floor modeling method of the second embodiment. Hereinafter, the floor modeling method of the second embodiment will be described with reference to FIG. 9, as appropriate. Incidentally, steps similar to those in the first embodiment are denoted by similar reference numerals, and the descriptions thereof are omitted or simplified.

First, in a state where the user wearing the HMD is standing on the floor, the sensor data output from the acceleration sensor 40 and information about the height of the user output from an arbitrary input section (not shown) are input to the data acquisition section 211. Then, the data acquisition section 211 outputs the information to the calculation section 212, and the calculation processing is executed by the calculation section 212. Thus, the gravity acceleration vector Vb at the time of the reference posture of the HMD and the distance h between the HMD at the time of the reference posture and the floor are calculated, and these are stored in the storage section 22 (Step S201).

Then, the calculation section 212, using the sensor data used in the calculation of the gravity acceleration vector Vb in the previous Step S201, calculates a virtual plane P perpendicular to the gravity acceleration vector Vb and parallel to the floor on which the user wearing the HMD stands, and further calculates a coordinate position where the virtual plane P is orthogonal to the gravity acceleration vector Vb as an initial position of the HMD (Step S202). Thus, the position of the HMD in the three-dimensional space is expressed in a coordinate system in which a coordinate position where the gravity acceleration vector Vb is orthogonal to the virtual plane P is taken as the initial position (origin position). Incidentally, the virtual plane P is set on two axes parallel to the floor (X-axis, Y-axis) among three axes (X-axis, Y-axis, Z-axis), for example, constituting the arbitrary world coordinate system (see FIG. 10).

Next, in a case where the determination section 213 determines that the movement amount calculated in Step S104 sees the condition 1 (difference Δh is equal to or less than predetermined threshold value) and that the displacement amount satisfies the condition 2 (angle θ is equal to or less than predetermined threshold value) (YES in Step S105), the model data generation section 214 reads out the sensor data based on the determination result from the storage section 22, and generates the model data relating to the floor at the position apart from the virtual plane P by h in the gravity direction using the sensor data (Step S203).

Thereafter, until the user walks all of desired areas, a series of operations from Step S103 to Step S107 (Step S103 to Step S104 to Step S105 to Step S203 (Step S107)) is repeated every predetermined time, and the modeling of the floor is performed as the user wearing the HMD walks (see FIG. 16).

[Action]

In the floor modeling system 100 according to the second embodiment, the model data relating to the floor is generated at the position away from the virtual plane P by h in the gravity direction as the user wearing the HMD walks. As a result, the model data is always generated at a constant distance from the virtual plane P. Therefore, in an environment in which the floor is configured of only a smooth plane not including stairs, slopes, and the like, the modeling more suitable for the floor becomes possible. In addition, since the model data is always generated at the constant distance from the virtual plane P, even when the user's head wearing the HMD is shaken, deterioration of the modeling accuracy caused by the shake is suppressed.

3. Third Embodiment

[Configuration of Floor Modeling System]

Figure 11:
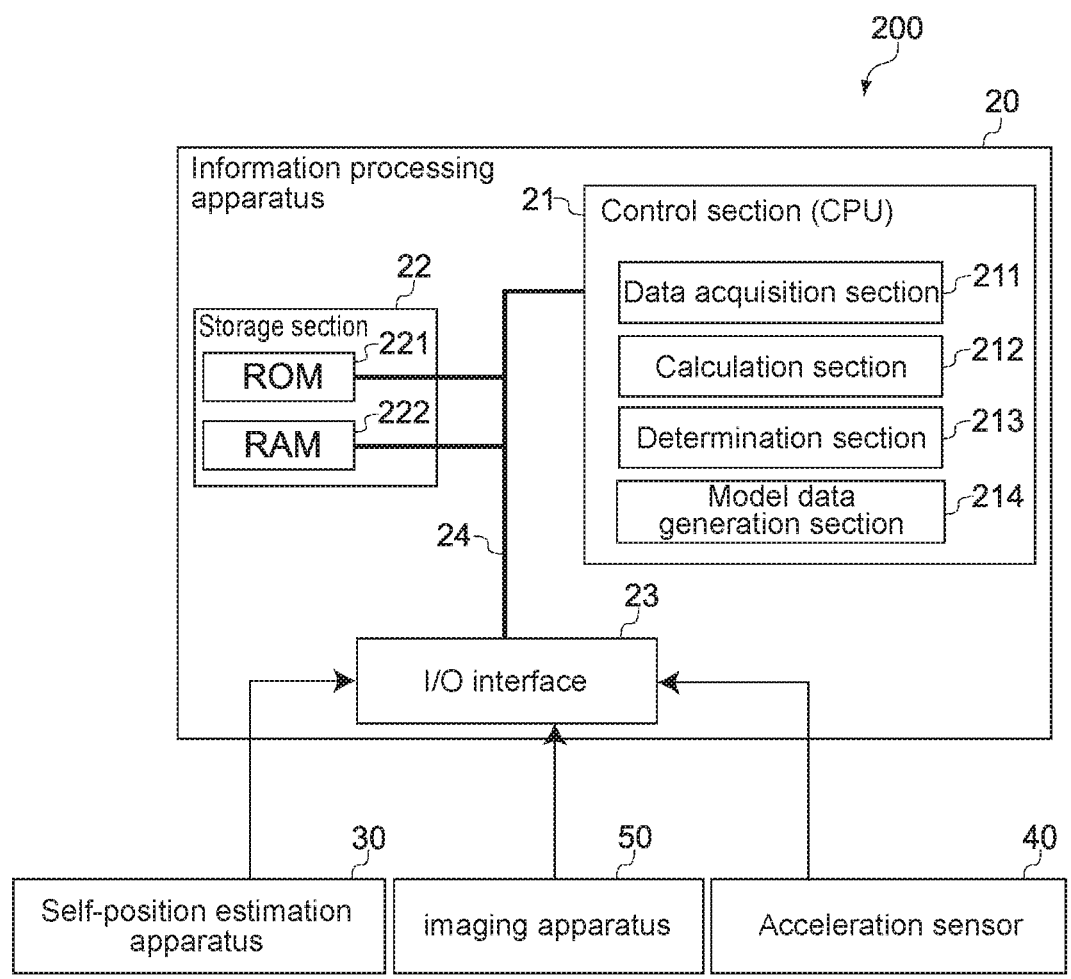
FIG. 11 is a block diagram showing a configuration example of a floor modeling system according to a second embodiment of the present technology.

FIG. 11 is a block diagram showing a configuration example of a floor modeling system 200 according to a third embodiment of the present technology. Hereinafter, similar configurations as those of the above embodiments are denoted by similar reference numerals, and detailed description thereof is omitted.

The floor modeling system 200 of the third embodiment differs from that of the first embodiment in that it further includes an imaging apparatus 50 as shown in FIG. 11.

The imaging apparatus 50 is, for example, a digital camera or a video camera having an image sensor such as a CCD (Charge Couple Device) and a CMOS (Complementary Metal Oxide Semiconductor).

With capturing by the imaging apparatus 50, for example, a captured image such as a JPEG, an MPEG2 and an MPEG4 (or moving image captured at predetermined frame rate) is generated and output to the information processing apparatus 20. Incidentally, in the third embodiment, a monocular camera is typically employed as the imaging apparatus.

[Floor Modeling Method]

Figure 12:
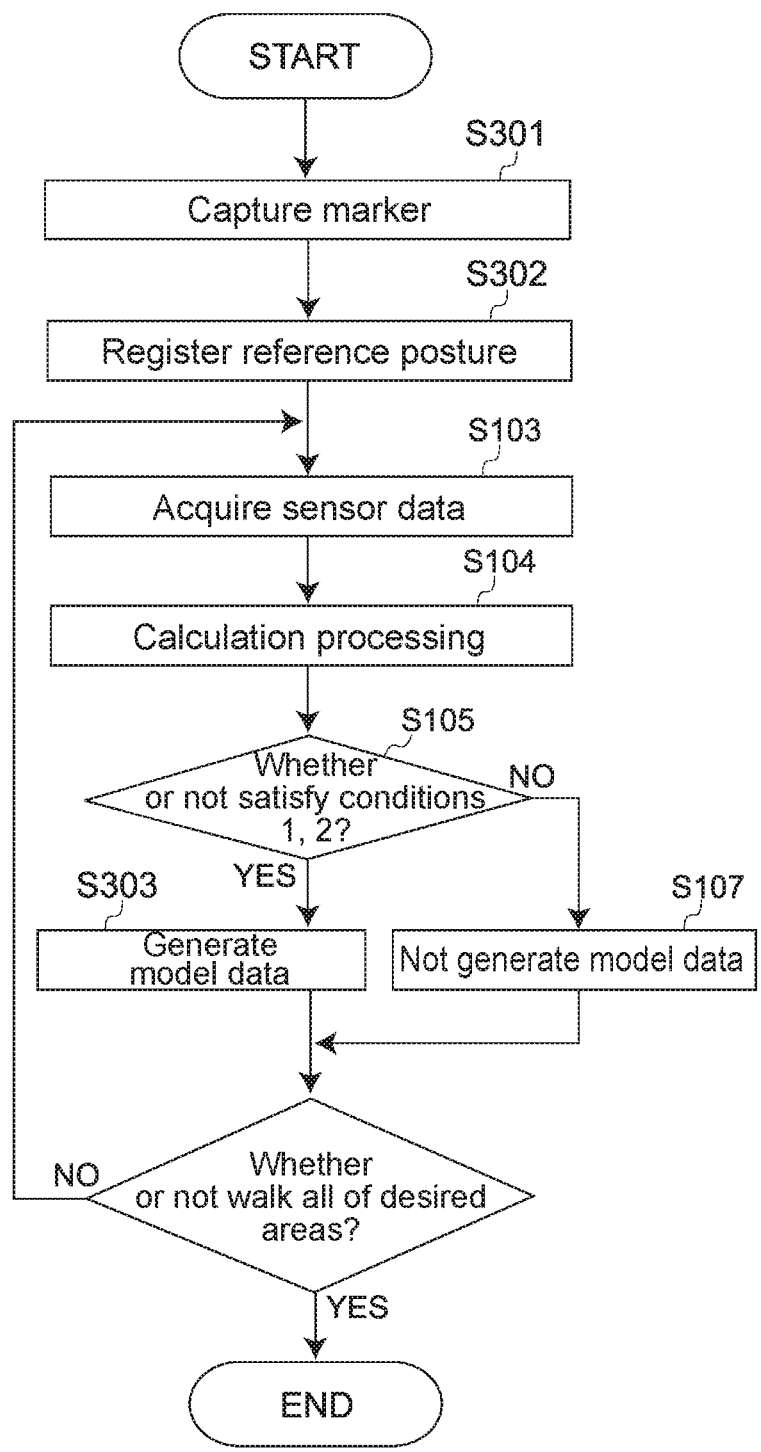
FIG. 12 is a flowchart showing a method of modeling the floor of the floor modeling system.
Figure 13:
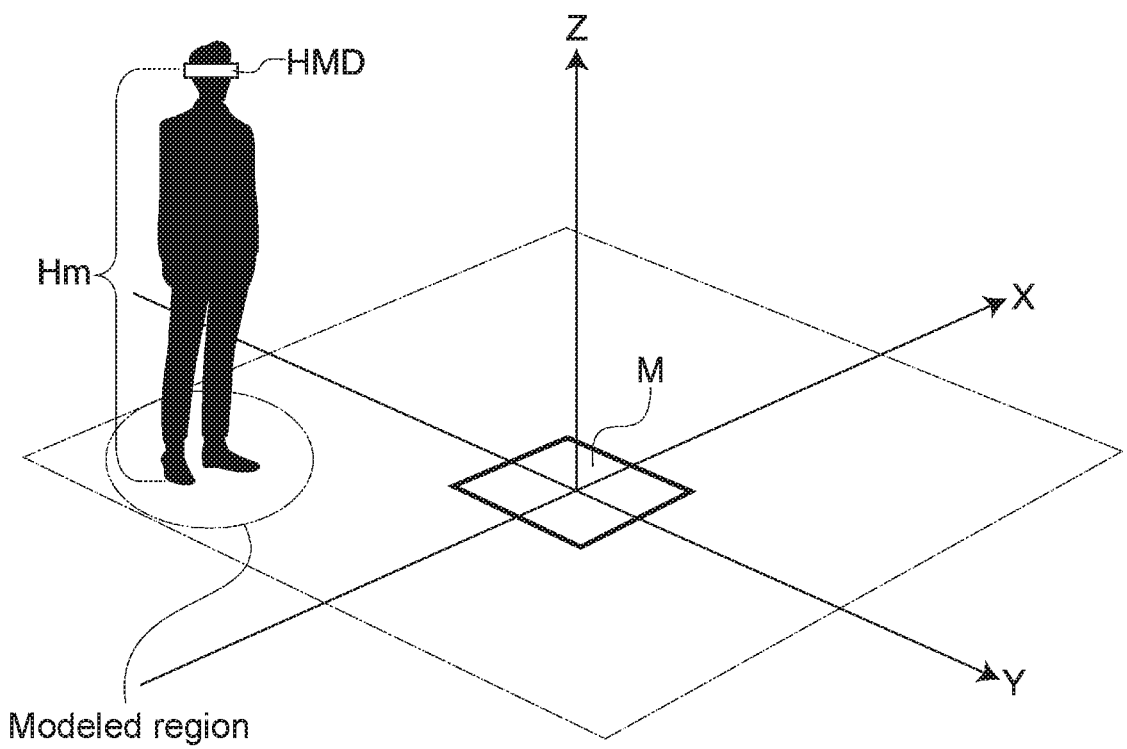
FIG. 13 is a conceptual diagram for explaining a floor modeling method of the embodiment.

FIG. 12 is a flowchart showing a method of modeling the floor of the floor modeling system 200 according to the third embodiment of the present technology, and FIG. 13 is a conceptual diagram for explaining a floor modeling method of the third embodiment. Hereinafter, the floor modeling method of the third embodiment will be described with reference to FIG. 12, as appropriate. Incidentally, steps similar to those in the above embodiments are denoted by similar reference numerals, and descriptions thereof are omitted or simplified.

First, the imaging apparatus 50 captures a known object (marker M) placed on the floor (Step S301). The imaging apparatus 50 outputs image data generated by capturing the marker M to the data acquisition section 211. The data acquisition section 211 outputs the image data acquired from the imaging apparatus 50 to the calculation section 212, and the calculation processing (image processing) by the calculation section 212 is executed.

Thus, a three-dimensional coordinate position of the HMD in a marker coordinate system with reference to the marker M is calculated. That is, the position of the HMD in the three-dimensional space is represented (initialized) in the marker coordinate system. Note that the marker M is typically a physical structure, but is not limited thereto, and may be an identifier such as a bar code.

Next, the reference posture of the HMD is registered by executing a triggering operation in a state in which the user wearing the HMD stands upright on the floor (Step S302). As a result, a distance Hm between the floor and the HMD when the user is in the upright posture is stored in the storage section 22.

In addition, at the time of registration of the reference posture of the HMD, the sensor data output from the self-position estimation apparatus 30 and the acceleration sensor 40 is input to the data acquisition section 211 in a state in which the user wearing the HMD stands upright on the floor. Then, the data acquisition section 211 outputs the sensor data to the calculation section 212, and the calculation processing is executed by the calculation section 212. Thus, the coordinate position $(R_b, t_b)$ and the gravity acceleration vector Vb of the HMD at the time of the reference posture in the marker coordinate system in a state in which the user wearing the HMD stands upright on the floor are calculated, and these are also stored in the storage section 22.

Next, in a case where it is determined by the determination section 213 that the movement amount calculated in Step S104 sees the condition 1 (difference Δh is equal to or less than predetermined threshold value) and that the displacement amount satisfies the condition 2 (angle θ is equal to or less than predetermined threshold value) (YES in S105), the model data generation section 214 reads the sensor data based on the determination result from the storage section 22 and generates model data relating to the floor at a position apart by Hm in the gravity direction from the HMD using the sensor data (Step S303).

Thereafter, until the user walks all of desired areas, a series of operations from Step S103 to Step S107 (Step S103 to Step S104 to Step S105 to Step S303 (Step S107)) is repeated every predetermined time, and the modeling of the floor is performed as the user wearing the HMD walks (see FIG. 16).

[Action]

The floor modeling system 200 of the third embodiment calculates the distance Hm from the HMD to the floor using the marker M placed on the floor, and generates the model data relating to the floor at the position apart from the HMD by the distance Hm. This makes it possible to model the floor without using the height of the user wearing the HMD.

Therefore, variations in modeling accuracy caused by different heights of users are suppressed.

4. Fourth Embodiment

[Configuration of floor modeling System]

Figure 14:
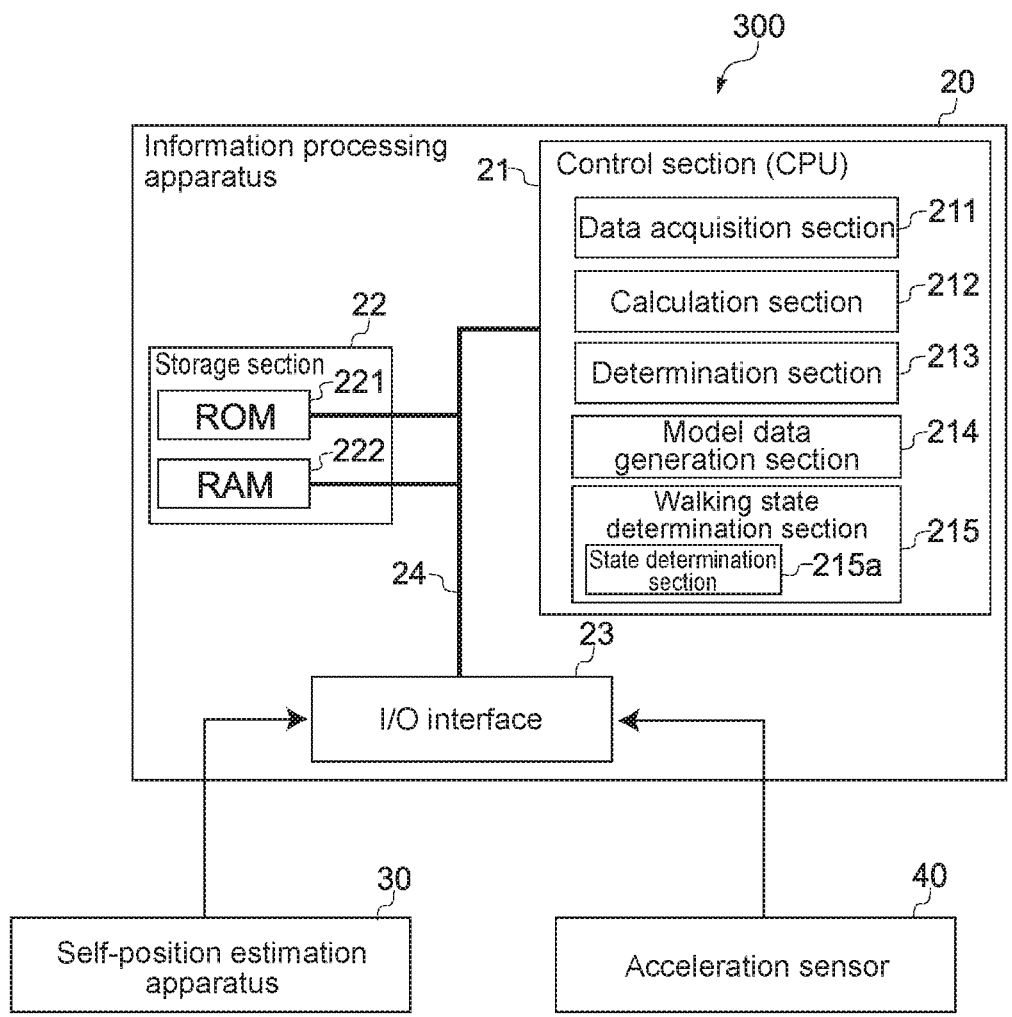
FIG. 14 is a block diagram showing a configuration example of a floor modeling system according to a fourth embodiment of the present technology.

FIG. 14 is a block diagram showing a configuration example of a floor modeling system 300 according to a fourth embodiment of the present technology. Hereinafter, similar configurations as those of the above embodiment are denoted by similar reference numerals, and a detailed description thereof will be omitted.

The floor modeling system 300 of the fourth embodiment is different from the above embodiments in that it functionally includes a walking state determination section 215, as shown in FIG. 14.

The walking state determination section 215 determines whether or not the user wearing the HMD is in a walking state on the basis of the sensor data acquired from the data acquisition section 211.

[Floor Modeling Method]

Figure 15:
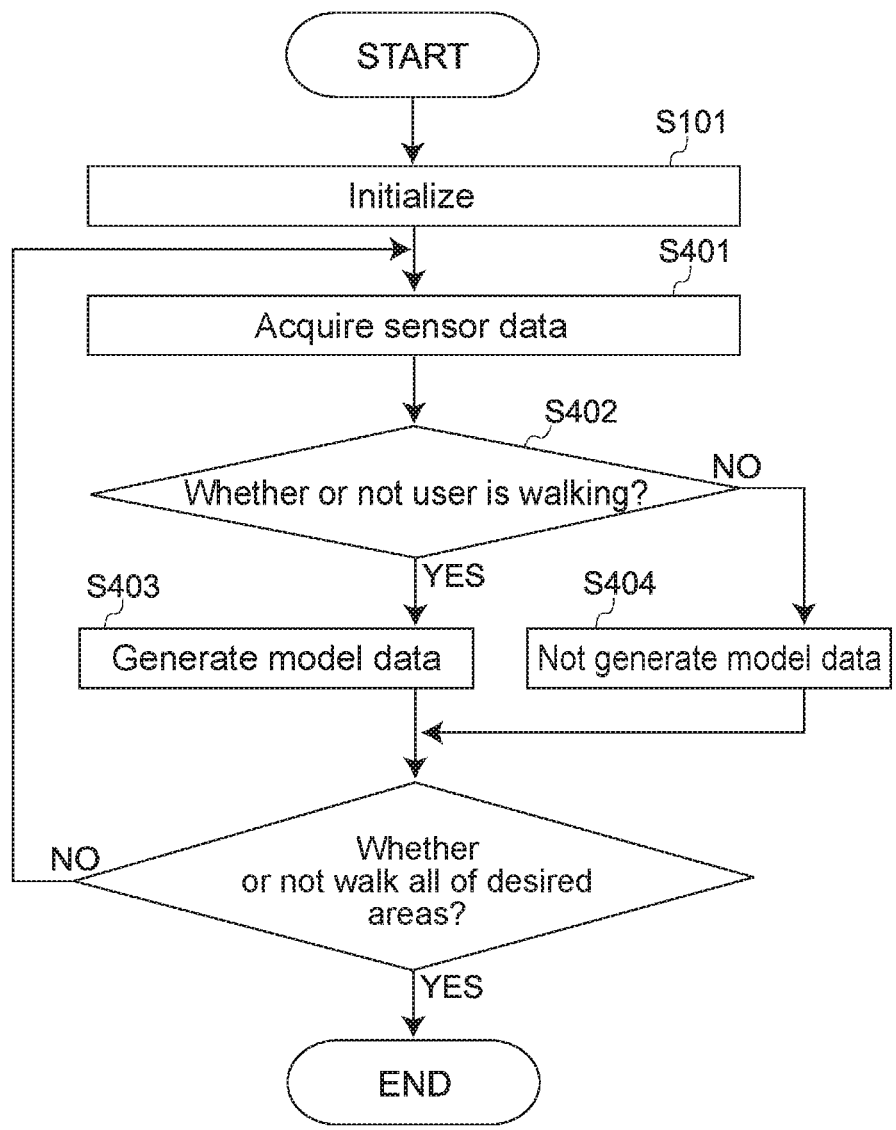
FIG. 15 is a flowchart showing a method of modeling the floor of the floor modeling system.

FIG. 15 is a flowchart showing a method of modeling the floor of the floor modeling system 300 according to the fourth embodiment of the present technology, and FIG. 16 is a conceptual diagram for explaining the floor modeling method of the fourth embodiment. Hereinafter, the floor modeling method of the fourth embodiment will be described with reference to FIG. 15 as appropriate. Incidentally, steps similar to those in the above embodiments are denoted by similar reference numerals, and descriptions thereof are omitted or simplified.

The sensor data output from the acceleration sensor 40 is input to the data acquisition section 211 (Step S401). The data acquisition section 211 outputs the sensor data to the walking state determination section 215.

Figure 17:
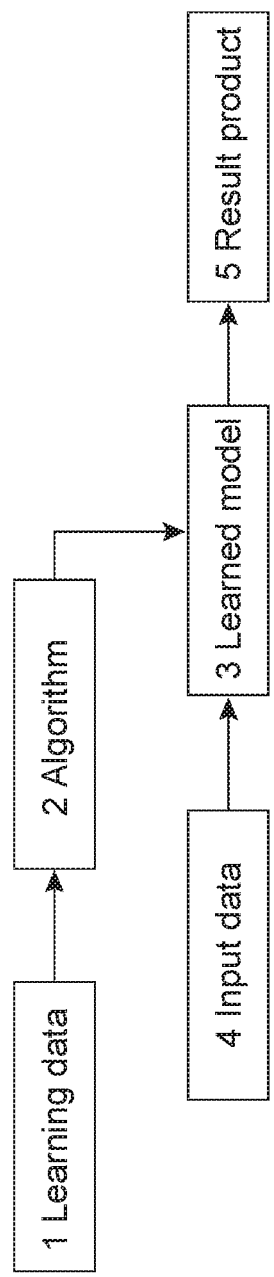
FIG. 17 is a block diagram schematically showing a processing procedure of a general specialized AI.

The walking state determination section 215 that acquires the sensor data from the data acquisition section 211 determines whether or not the user wearing the HMD is in the walking state on the basis of the sensor data (Step S402). In this case, the walking state determination section 215 determines whether or not the user is in the walking state by using a so-called specialized AI (Artificial Intelligence) that replaces a user's intellectual work. FIG. 17 is a block diagram schematically showing a processing procedure of a general specialized AI.

The specialized AI roughly refers to a mechanism for obtaining a result by applying arbitrary input data to the learned model constructed by incorporating learning data into an algorithm functioning as a learning program. Hereinafter, referring to FIG. 17 as appropriate, Step S402 will be described.

First, a feature amount (average, dispersion, skewness, kurtosis, signal power, zero crossing number or maximum peak frequency, etc.) extracted from the sensor data output from the acceleration sensor 40 stored in the storage section 22 in advance is read out by the walking state determination section 215 from the storage section 22. The feature amount is extracted, for example, by cutting out the sensor data output from the acceleration sensor 40 at a predetermined time width, and corresponds to "learning data" in FIG. 17.

Next, the walking state determination section 215 constructs a state determination section 215a by incorporating the learning data read from the storage section 22 into a preset algorithm. As a result, the walking state determination section 215 is configured to include the state determination section 215a.

The algorithm described above corresponds to the "algorithm" in FIG. 17, and functions as, for example, the machine learning algorithm. The state determination section 215a corresponds to the "learned model" in FIG. 17. The state determination section 215a is typically configured of a single learned model, but it is not limited thereto, and may be configured by combining a plurality of learned models, for example.

A type of the machine learning algorithm is not particularly limited, and may be an algorithm using a neural network such as an RNN (Recurrent Neural Network), a CNN (Convolutional Neural Network) or an MLP (Multilayer Perceptron), or any algorithm for executing a supervised learning method, an unsupervised learning method, a semi-supervised learning method, an enhanced learning method, or the like.

Next, the walking state determination section 215 extracts the above-described feature amount from the sensor data acquired from the data acquisition section 211. Then, by applying the information about the feature amount to the state determination section 215a, it is determined whether or not the user wearing the HMD is in the walking state. The determination result is output to the storage section 22 and stored in the storage section 22 as new learning data.

Subsequently, in a case where the walking state determination section 215 determines that the user wearing the HMD is in the walking state (YES in Step S402), the model data generation section 214 reads out the sensor data based on the determination result from the storage section 22, and generates model data relating to the floor at the position away from the HMD by h in the gravity direction using the sensor data (Step S403).

On the other hand, if it is not determined by the walking state determination section 215 that the user wearing the HMD is in the walking state (NO in Step S402), the model data generation section 214 does not use the sensor data based on the determination result and does not generate the model data relating to the floor (Step S404).

Incidentally, in Step S402, the feature amount extracted from the sensor data acquired from the data acquisition section 211 corresponds to the "input data" in FIG. 17, and the determination result of the walking condition determining section 215 corresponds to a "result product" in FIG. 17.

Thereafter, until the user walks all of desired areas, a series of operations from S401 to S404 (Step S401 to Step S402 to Step S403 (Step S404)) is repeated every predetermined time, and the modeling of the floor is performed as the user wearing the HMD walks (see FIG. 16).

[Action]

In the floor modeling system 300 of the fourth embodiment, the modeling of the floor is performed only when the user wearing the HMD is walking. This avoids the modeling of regions other than the floor, since the floor is modeled only when the user moves greatly. In addition, even in an environment where a slope or the like exists, the floor can be modeled continuously.

At this time, it may be determined whether or not the modeling is performed as a floor in which a height changes smoothly like a slope or as a floor in which the height is discretized like a staircase in accordance with a change of the output of the self-position estimation apparatus 30, or labels of flat surface walking, slope walking, and staircase walking may be output to the state determination section 215a, and the modeling method may be changed in accordance with the label.

5. Fifth Embodiment

[Configuration of Floor Modeling System]

Figure 18:
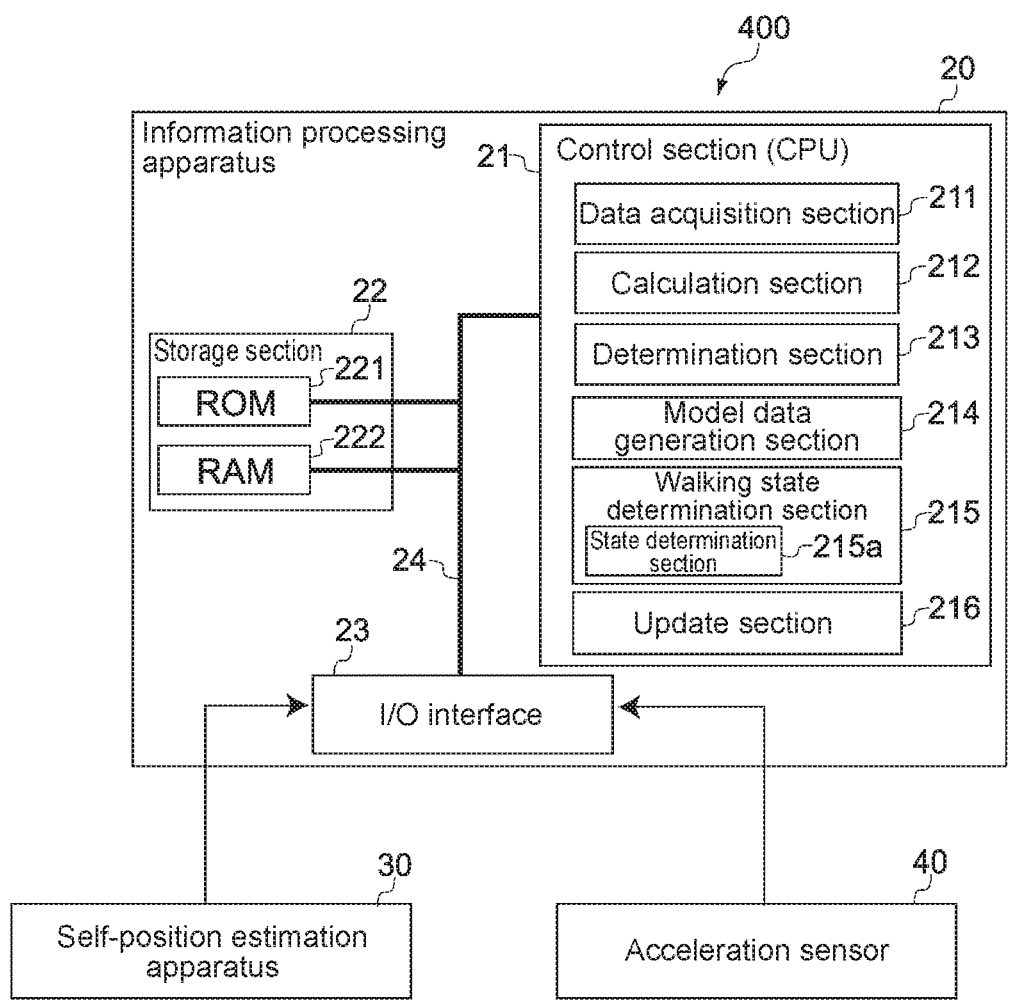
FIG. 18 is a block diagram showing a configuration example of a floor modeling system according to a fifth embodiment of the present technology.

FIG. 18 is a block diagram showing a configuration example of a floor modeling system 400 according to a fifth embodiment of the present technology. Hereinafter, similar configurations as those of the above embodiments are denoted by similar reference numerals, and detailed description thereof is omitted.

The floor modeling system 400 of the fifth embodiment differs from the above-described embodiment in that it functionally includes an update section 216, as shown in FIG. 18.

In a case where the period in which the user is determined to be in the walking state by the walking state determination section 215 is equal to or more than a predetermined threshold value, the update section 216 executes update processing in which the sensor data different from the sensor data detected at the time of the reference posture of the HMD is used as the sensor data of the new reference posture.

[Floor Modeling Method]

Figure 19:
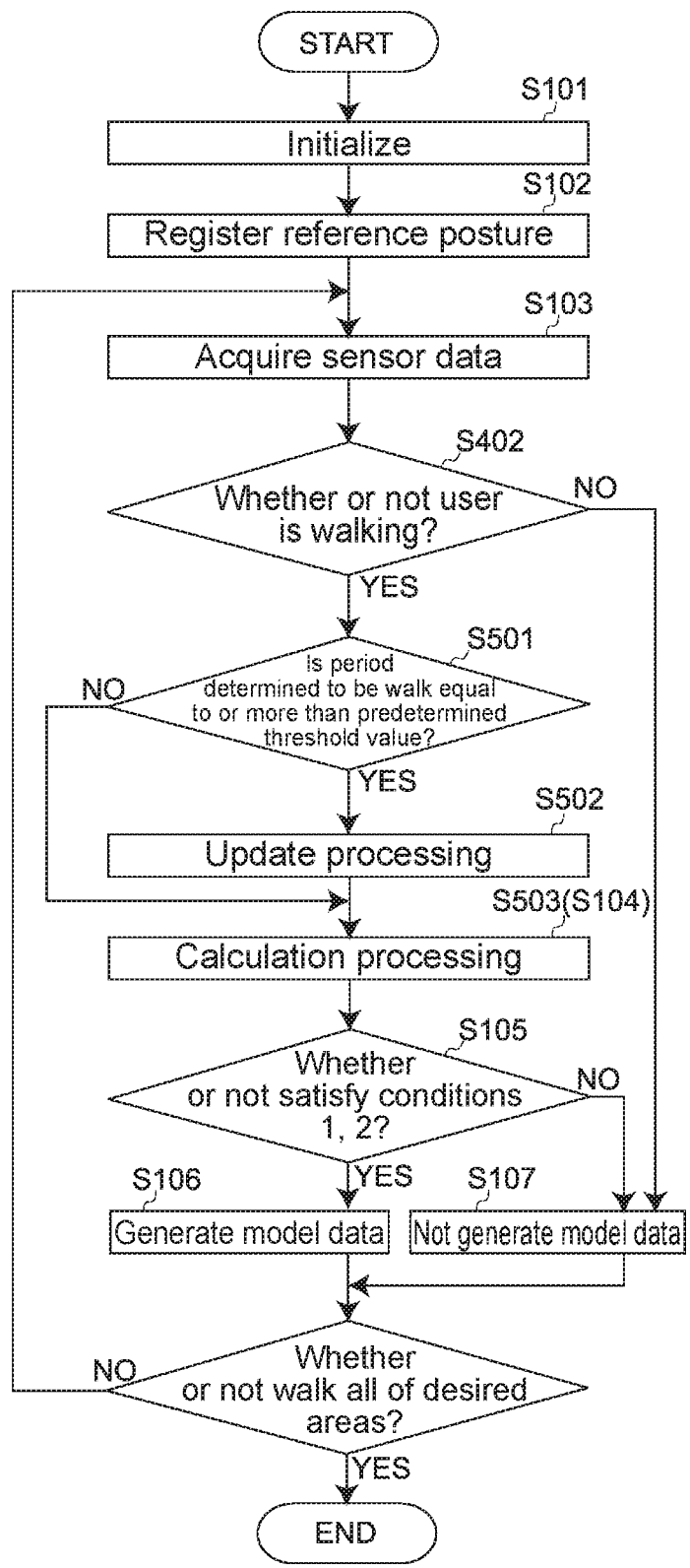
FIG. 19 is a flowchart showing a method of modeling the floor of the floor modeling system.
Figure 20:
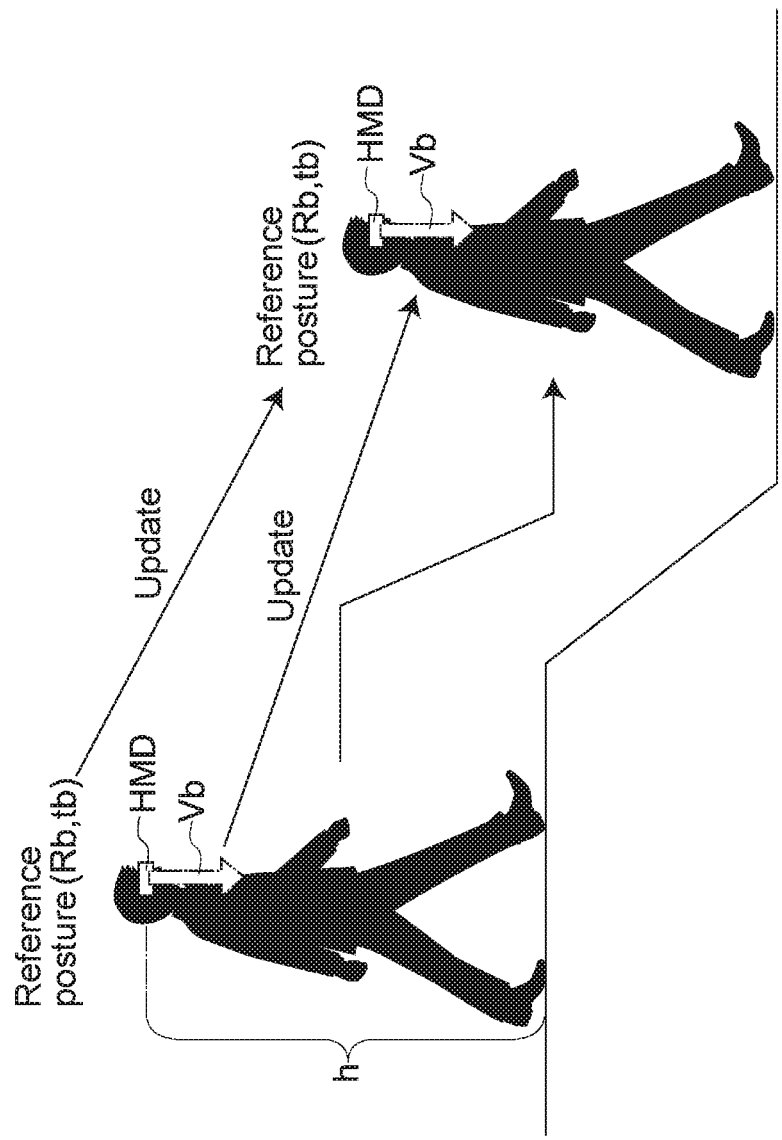
FIG. 20 is a conceptual diagram for explaining the floor modeling method of the embodiment.

FIG. 19 is a flowchart showing a method of modeling the floor of the floor modeling system 400 according to the fifth embodiment of the present technology, and FIG. 20 is a conceptual diagram for explaining the floor modeling method of the fifth embodiment. Hereinafter, the floor modeling method of the fifth embodiment will be described with reference to FIG. 19. Incidentally, steps similar to those in the above embodiments are denoted by similar reference numerals, and descriptions thereof are omitted or simplified.

In a case where the period in which the user is determined to be in the walking state by the walking state determination section 215 is equal to or more than a predetermined threshold value (for example, 3 seconds to 10 seconds or more) (YES in Step S501), the update section 216 reads the sensor data acquired from the self-position estimation apparatus 30 and the acceleration sensor 40 from the storage section 22 after a predetermined period has elapsed after the previous Step S102 is executed, and outputs the sensor data to the calculation section 212 as the sensor data of the new reference posture (Step S502). Note that the time interval of the update processing by the walking state determination section 215 may be arbitrarily set by the user.

The calculation section 212 that acquires the sensor data from the update section 216 calculates the coordinate position ($R_b$, $t_b$) and the gravity acceleration vector Vb of the HMD at the time of the new reference posture on the basis of the sensor data, and stores them in the storage section 22.

Next, the calculation section 212 calculates the movement amount of the HMD and the displacement amount of the posture of the HMD (Step S503). Specifically, the calculation section 212 calculates the movement amount of the HMD using the coordinate position ($R_b$, $t_b$) of the HMD at the time of the new reference posture and the coordinate position (R, t) of the HMD calculated on the basis of the sensor data acquired in the previous Step S103. The movement amount is the difference Δh between the distance between the HMD and the floor after moving from the new reference posture and the distance between the HMD and the floor during the new reference posture.

Further, the calculation section 212 calculates the displacement amount of the posture of the HMD by using the gravity acceleration vector Vb of the HMD at the time of the new reference posture and the gravity acceleration vector Vg of the HMD calculated on the basis of the sensor data acquired in the previous Step S103. The displacement amount is the angle θ formed between the gravity acceleration vector Vb of the HMD at the new reference posture and the gravity acceleration vector Vg of the HMD after the movement from the new reference posture.

On the other hand, in a case where the period during which it is determined that the user is walking is less than a predetermined threshold value (e.g., less than 3 seconds) (NO in Step S501), the walking-state determination section 215 executes the calculation processing (Step S104) described in the first embodiment.

Next, in a case where the determination section 213 determines that the movement amount calculated in Step S503 (Step S104) sees the condition 1 (difference Δh is equal to or less than predetermined threshold value) and that the displacement amount satisfies the condition 2 (angle θ is equal to or less than predetermined threshold value) (YES in S105), the model data generation section 214 reads out the sensor data based on the determination result from the storage section 22, and generates the model data relating to the floor at the position apart from the HMD by h in the gravity force direction using the sensor data (Step S106).

Thereafter, until the user walks all of desired areas, a series of operations from Step S103 to Step S107 (Step S103 to Step S402 to Step S501 to Step S502 to Step 503 to Step 105 to Step S106 (Step S107), or Step S103 to Step S402 to Step S107, or Step S103 to Step S402 to Step S501 to Step S104 to Step S105 to Step S106 (Step S107)) is repeated every predetermined time, and the modeling of the floor is performed as the user wearing the HMD walks (see FIG. 16).

[Action]

The floor modeling system 400 of the fifth embodiment executes the update processing for updating the coordinate position ($R_b$, $t_b$) and the gravity acceleration vector Vb of the reference posture along with the movement of the user wearing the HMD every predetermined time.

As a result, it is possible to suppress the reference posture from becoming inoperative due to the occurrence of missing or displacement of the HMD along with the elapse of time. In addition, in an environment in which there is a difference in height such as a slope, a staircase, or the like, a floor having a height other than the height corresponding to the reference posture can be modeled.

Although the embodiments of the present technology have been described above, the present technology is not limited to the embodiments described above, and it should be appreciated that various modifications may be added.

For example, in the above embodiments, typically the SLAM using the camera sensor is employed as the self-position estimation apparatus 30, but it is not limited thereto, the SLAM using a depth sensor or a millimeter-wave sensor or the like may be employed. Further, the floor modeling systems 100, 200, 300, and 400 in the present technology are not only the self-position estimation apparatus 30 and the acceleration sensor 40, but also may be configured with a gyro sensor, a level, or the like.

Further, in the fourth embodiment described above, it is determined whether or not the model data relating to the floor is generated on the basis of whether or not the user is walking, but it is not limited thereto, and a determination criterion when generating the model data may be whether or not the user is walking and whether or not at least one of the condition 1 or 2 is satisfied.

In addition, in the fifth embodiment, the coordinate position ($R_b$, $t_b$) and the gravity acceleration vector Vb of the HMD of the reference posture are automatically updated at every predetermined time, but it is not limited thereto, and may be updated according to a user's intention.

In addition, in the above embodiments, examples in which the floor modeling systems 100, 200, 300, and 400 are applied to the HMD have been described, but it is not limited thereto, and may be applied to a general moving body moving relative to the floor (for example, animal, vehicle, autonomous mobile robot, or the like), and the application thereof does not matter.

The present technology may also have the following structures.

(1) An information processing apparatus, including: a control section, including
  a determination section that determines whether or not a predetermined modeling condition is satisfied on the basis of sensor data acquired along with a movement of a moving object, and
a model data generation section that generates model data relating to a floor using the sensor data in a case where it is determined by the determination section that the predetermined modeling condition is satisfied.

(2) The information processing apparatus according to (1), in which
  the control section further includes a data acquisition section that acquires sensor data necessary for generating the model data every predetermined time along with the movement of the movable body movable on the floor.

(3) The information processing apparatus according to (2), in which
  the control section further includes a calculation section that calculates a movement amount of the moving body and a displacement amount of a posture of the moving body on the basis of the sensor data acquired from the data acquisition section, and
  the determination section determines whether or not the movement amount satisfies a predetermined first condition and whether or not the displacement amount satisfies a predetermined second condition from a calculation result of the calculation section, and
  the model data generation section generates the model data using sensor data based on a determination result determined by the determination section to satisfy the first and second conditions.

(4) The information processing apparatus according to (3), in which
  the calculation section calculates a difference between a height of the moving body in a first posture from the floor in a gravity direction and a height of the moving body in a second posture from the floor in the gravity direction as the movement amount, and
  the determination section determines that the first condition is satisfied if the difference is equal to or less than a predetermined threshold value.

(5) The information processing apparatus according to (3) or (4), in which
the calculation section calculates a gravity acceleration vector of the moving body from the sensor data acquired from the data acquisition section and calculates the displacement amount on the basis of the gravity acceleration vector.

(6) The information processing apparatus according to any one of (3) to (5), in which
  the calculation section calculates an angle formed by the gravity acceleration vector of the moving body in the first posture and the gravity acceleration vector of the moving body in the second posture as the displacement amount, and the displacement amount determines that the second condition is satisfied if the angle is equal to or less than a predetermined threshold value.

(7) The information processing apparatus according to any one of (3) to (6), in which
  the calculation section calculates a coordinate position where the gravity acceleration vector of the moving body is orthogonal to a virtual plane in parallel with the floor as an initial position of the moving body, and
  the model data generation section generates the model data at a position apart from the virtual plane by a predetermined distance in the gravity direction.

(8) The information processing apparatus according to any one of (3) to (7), in which
  the calculation section calculates a distance between the floor on which a marker is placed and the moving body from the coordinate position of the moving body in a marker coordinate system with reference to the marker placed on the floor, and
  the model data generation section generates the model data at the position apart from the virtual plane by the predetermined distance in the gravity direction.

(9) The information processing apparatus according to any one of (2) to (8), in which
  the control section further includes a walking state determination section that determines whether or not the user having the moving body is in a walking state on the basis of the sensor data acquired from the data acquisition section.

(10) The information processing apparatus according to (9), in which
  the control section further includes an update section that executes update processing in which sensor data different from sensor data detected at the time of the reference posture of the moving body is sensor data of a new reference posture in a case where a period during which the user is determined to be in the walking state by the walking state determination section is equal to or longer than a predetermined threshold value.

(11) An information processing method, including:
  determining whether or not a predetermined modeling condition is satisfied on the basis of sensor data acquired along with a movement of a moving body; and
  generating model data relating to a floor using the predetermined sensor data in a case where it is determined that the predetermined modeling condition is satisfied.

(12) A program causes an information processing apparatus to execute:
  a step of determining whether or not to satisfy a predetermined modeling condition on the basis of sensor data acquired along with a movement of a moving object, and
  a step of generating model data relating to a floor using the sensor data in a case where it is determined that the predetermined modeling condition is satisfied.

(13) A floor modeling system, including:
  a self-position estimation apparatus that is mounted on a moving body moving on a floor and is configured to be able to estimate a position of the moving body in a three-dimensional space;
  an acceleration sensor that is mounted on the moving body; and
  an information processing apparatus including
    a control section, including
      a determination section that determines whether or not a predetermined modeling condition is satisfied on a basis of sensor data acquired along with a movement of a moving object, and a model data generation section that generates model data relating to a floor using the sensor data in a case where it is determined by the determination section that the predetermined modeling condition is satisfied.

REFERENCE SIGNS LIST 20 information processing apparatus
30 self-position estimating apparatus
40 acceleration sensor
211 data acquisition section
212 calculation section
213 determination section
214 model data generation section
215 walking state determination section
216 update section
100, 200, 300, 400 floor modeling system

The invention claimed is:

1. An information processing apparatus, comprising:
circuitry configured to:
acquire sensor data necessary for generating model data at every specific time, along with a movement of a moving body movable on a floor;
calculate a movement amount of the moving body based on the acquired sensor data, wherein the movement amount is a difference between a height of the moving body in a first posture from the floor in a gravity direction and a height of the moving body in a second posture from the floor in the gravity direction;
calculate, based on the sensor data, an angle between a gravity acceleration vector of the moving body in the first posture and the gravity acceleration vector of the moving body in the second posture as a displacement amount;
determine whether a specific first condition is satisfied based on the calculated movement amount, wherein the specific first condition is satisfied if the difference is equal to or less than a second threshold value;
determine that a specific second condition is satisfied based on:
the calculated movement amount, and
the angle that is equal to or less than a specific threshold value; and
generate model data relating to the floor using the sensor data based on the determination that each of the specific first condition and the specific second condition is satisfied.

2. The information processing apparatus according to claim 1, wherein the circuitry is further configured to:
calculate the gravity acceleration vector of the moving body from the acquired sensor data; and
calculate the displacement amount based on the gravity acceleration vector.

3. The information processing apparatus according to claim 1, wherein the circuitry is further configured to:
calculate a coordinate position where the gravity acceleration vector of the moving body is orthogonal to a virtual plane that is parallel with the floor as an initial position of the moving body; and
generate the model data at a position apart from the virtual plane by a specific distance in the gravity direction.

4. The information processing apparatus according to claim 3, wherein the circuitry is further configured to:

calculate a distance between the floor on which a marker is placed and the moving body from the coordinate position of the moving body in a marker coordinate system with reference to the marker placed on the floor; and
generate the model data at the position apart from the virtual plane by the specific distance in the gravity direction.

5. The information processing apparatus according to claim 1, wherein the circuitry is further configured to determine control whether a user having the moving body is in a walking state based on the acquired sensor data.

6. The information processing apparatus according to claim 5, wherein the circuitry is further configured to execute update processing in which a specific sensor data, different from the sensor data, is sensor data of the second posture, wherein
the update processing is executed in a period during which the user is determined to be in the walking state, and
the period is equal to or longer than a second threshold value.

7. An information processing method, comprising:
acquiring sensor data necessary for generating model data at every specific time, along with a movement of a moving body movable on a floor;
calculating a movement amount of the moving body based on the acquired sensor data, wherein the movement amount is a difference between a height of the moving body in a first posture from the floor in a gravity direction and a height of the moving body in a second posture from the floor in the gravity direction;
calculating, based on the sensor data, an angle between a gravity acceleration vector of the moving body in the first posture and the gravity acceleration vector of the moving body in the second posture as a displacement amount;
determining whether a specific first condition is satisfied based on the calculated movement amount, wherein the specific first condition is satisfied if the difference is equal to or less than a second threshold value; and
determining that a specific second condition is satisfied based on:
the calculated movement amount, and
the angle that is equal to or less than a specific threshold value; and
generating model data relating to the floor using the sensor data based on the determination that each of the specific first condition and the specific second condition is satisfied.

8. A non-transitory computer-readable medium having stored thereon, computer-executable instructions which, when executed by a processor, cause the processor to execute operations, the operations comprising:
acquiring sensor data necessary for generating model data at every specific time, along with a movement of a moving body movable on a floor;
calculating a movement amount of the moving body based on the acquired sensor data, wherein the movement amount is a difference between a height of the moving body in a first posture from the floor in a gravity direction and a height of the moving body in a second posture from the floor in the gravity direction;
calculating, based on the sensor data, an angle between a gravity acceleration vector of the moving body in the first posture and the gravity acceleration vector of the moving body in the second posture as a displacement amount;

determining whether to satisfy a specific first condition based on the calculated movement amount, wherein the specific first condition is satisfied if the difference is equal to or less than a second threshold value;

determining that a specific second condition is satisfied based on:

the calculated movement amount, and the angle that is equal to or less than a specific threshold value; and generating model data relating to the floor using the sensor data based on the determination that each of the specific first condition and the specific second condition is satisfied.

9. A floor modeling system, comprising:

a self-position estimation apparatus that is mounted on a moving body moving on a floor and is configured to be able to estimate a position of the moving body in a three-dimensional space;

an acceleration sensor that is mounted on the moving body; and an information processing apparatus comprising:

circuitry configured to:

acquire sensor data necessary for generating model data at every specific time, along with a movement of the moving body movable on the floor;

calculate a movement amount of the moving body based on the acquired sensor data, wherein the movement amount is a difference between a height of the moving body in a first posture from the floor in a gravity direction and a height of the moving body in a second posture from the floor in the gravity direction;

calculate, based on the sensor data, an angle between a gravity acceleration vector of the moving body in the first posture and the gravity acceleration vector of the moving body in the second posture as a displacement amount;

determine whether a specific first condition is satisfied based on the calculated movement amount, wherein the specific first condition is satisfied if the difference is equal to or less than a second threshold value;

determine that a specific second condition is satisfied based on:

the calculated movement amount, and the angle that is equal to or less than a specific threshold value; and generate model data relating to the floor using the sensor data based on the determination that each of the specific first condition and the specific second condition is satisfied.

* * * * *